(12) United States Patent
Feng et al.

(10) Patent No.: US 9,327,482 B2
(45) Date of Patent: May 3, 2016

(54) BONDED PART WITH LAMINATED RUBBER MEMBER AND METHOD OF MAKING

(71) Applicant: GATES CORPORATION, Denver, CO (US)

(72) Inventors: Yuding Feng, Rochester Hills, MI (US); Lin Zhu, Rochester Hills, MI (US); Yahya Hodjat, Oxford, MI (US); Paul N. Dunlap, Parker, CO (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 14/749,181

(22) Filed: Jun. 24, 2015

(65) Prior Publication Data

US 2015/0290918 A1  Oct. 15, 2015

Related U.S. Application Data

(62) Division of application No. 12/494,951, filed on Jun. 30, 2009, now abandoned.

(51) Int. Cl.
 *B32B 37/24* (2006.01)
 *C08J 3/24* (2006.01)
 (Continued)

(52) U.S. Cl.
 CPC .............. *B32B 37/24* (2013.01); *B32B 3/263* (2013.01); *B32B 7/12* (2013.01); *B32B 9/005* (2013.01); *B32B 9/043* (2013.01); *B32B 15/06* (2013.01); *B32B 15/18* (2013.01); *B32B 15/20* (2013.01); *B32B 25/02* (2013.01); *B32B 25/042* (2013.01); *B32B 25/08* (2013.01); *B32B 25/14* (2013.01); *B32B 27/18* (2013.01); *B32B 27/20* (2013.01); *B32B 27/28* (2013.01); *B32B 27/281* (2013.01); *B32B 27/34* (2013.01); *B32B 27/365* (2013.01); *B32B 37/10* (2013.01);
 (Continued)

(58) Field of Classification Search
 CPC ....................................................... B32B 37/24
 USPC ......................................................... 156/325
 See application file for complete search history.

(56) References Cited

U.S. PATENT DOCUMENTS 2,409,759 A   10/1946  Hosking
2,707,205 A    4/1955  Abbott et al.
(Continued)

FOREIGN PATENT DOCUMENTS

CA    2027210    4/1991
EP     832915 A   4/1998
(Continued)

*Primary Examiner* — Daniel Lee
(74) *Attorney, Agent, or Firm* — Paul N. Dunlap, Esq.; Jeffrey A. Thurnau, Esq.

(57) ABSTRACT

A method of forming a bonded part with a press-fit, vulcanized rubber member residing in compression between two rigid members and bonded thereto. The rubber member is a laminate with a core layer between two self-bonding rubber layers. The bonded part may be, for example, a vibration damper, isolator or absorber. The core layer and the self-bonding layers may have the same primary elastomer and cure system type, and the self-bonding layers have an adhesion promoter not present in the core layer. The adhesive layers may be from 0.05 to 1 mm thick or from 5% to 10% of the laminate thickness.

The method includes forming a rubber core layer, curing it, applying a rubber adhesive layer on each side to form a laminate, inserting the laminate between two rigid members under compression, and post-curing to form a bonded part. The adhesive layers may be partially cured before inserting.

14 Claims, 2 Drawing Sheets

(51) Int. Cl.

| | |
|---|---|
| *B32B 38/00* | (2006.01) |
| *B32B 37/15* | (2006.01) |
| *B32B 37/12* | (2006.01) |
| *B32B 37/10* | (2006.01) |
| *C08J 5/12* | (2006.01) |
| *B32B 37/18* | (2006.01) |
| *B32B 7/12* | (2006.01) |
| *B32B 9/00* | (2006.01) |
| *B32B 9/04* | (2006.01) |
| *B32B 15/06* | (2006.01) |
| *B32B 15/18* | (2006.01) |
| *B32B 15/20* | (2006.01) |
| *B32B 25/02* | (2006.01) |
| *B32B 25/04* | (2006.01) |
| *B32B 25/08* | (2006.01) |
| *B32B 25/14* | (2006.01) |
| *B32B 27/18* | (2006.01) |
| *B32B 27/20* | (2006.01) |
| *B32B 27/28* | (2006.01) |
| *B32B 27/34* | (2006.01) |
| *B32B 27/36* | (2006.01) |
| *B32B 3/26* | (2006.01) |

(52) U.S. Cl.
CPC .......... *B32B 37/1284* (2013.01); *B32B 37/153* (2013.01); *B32B 37/185* (2013.01); *B32B 38/0012* (2013.01); *B32B 38/0036* (2013.01); *C08J 3/24* (2013.01); *C08J 5/124* (2013.01); *B32B 2037/1253* (2013.01); *B32B 2037/243* (2013.01); *B32B 2250/248* (2013.01); *B32B 2307/306* (2013.01); *B32B 2307/50* (2013.01); *B32B 2307/546* (2013.01); *B32B 2307/56* (2013.01); *B32B 2307/712* (2013.01); *B32B 2605/00* (2013.01); *B32B 2605/08* (2013.01); *C08J 2319/00* (2013.01); *C08J 2323/08* (2013.01); *C08J 2323/16* (2013.01); *C08J 2323/26* (2013.01); *Y10T 428/31924* (2015.04)

(56) References Cited

U.S. PATENT DOCUMENTS

| | | |
|---|---|---|
| 3,185,266 A | 5/1965 | Hofmeister |
| 3,981,762 A | 9/1976 | Davis et al. |
| 5,122,214 A | 6/1992 | Zurfluh et al. |
| 5,213,879 A | 5/1993 | Niwa et al. |
| 5,300,569 A | 4/1994 | Drake et al. |
| 5,330,165 A | 7/1994 | van Goubergen |
| 5,449,152 A | 9/1995 | Byrnes et al. |
| 5,712,038 A | 1/1998 | Yamazaki et al. |
| 5,753,063 A | 5/1998 | Sakakibara et al. |
| 5,776,294 A | 7/1998 | Nagel |
| 5,858,521 A | 1/1999 | Okuda et al. |
| 6,345,430 B1 | 2/2002 | Haga et al. |
| 6,793,474 B2 | 9/2004 | Groeblacher et al. |
| 6,821,610 B2 | 11/2004 | Hamulski et al. |
| 7,078,104 B2 | 7/2006 | Dunlap |
| 7,166,678 B2 | 1/2007 | Dunlap et al. |
| 7,291,241 B2 | 11/2007 | Dunlap |
| 7,834,090 B2 | 11/2010 | Feng et al. |
| 8,246,872 B2 | 8/2012 | Hodjat et al. |
| 2008/0105080 A1 | 5/2008 | Christenson |

FOREIGN PATENT DOCUMENTS

| | | |
|---|---|---|
| GB | 2244954 | 12/1991 |
| JP | 06122772 A | 5/1994 |
| JP | 1038151 A | 2/1998 |
| JP | 2003214566 A | 7/2003 |
| JP | 2005076129 A | 3/2005 |
| JP | 2006283939 A | 10/2006 |

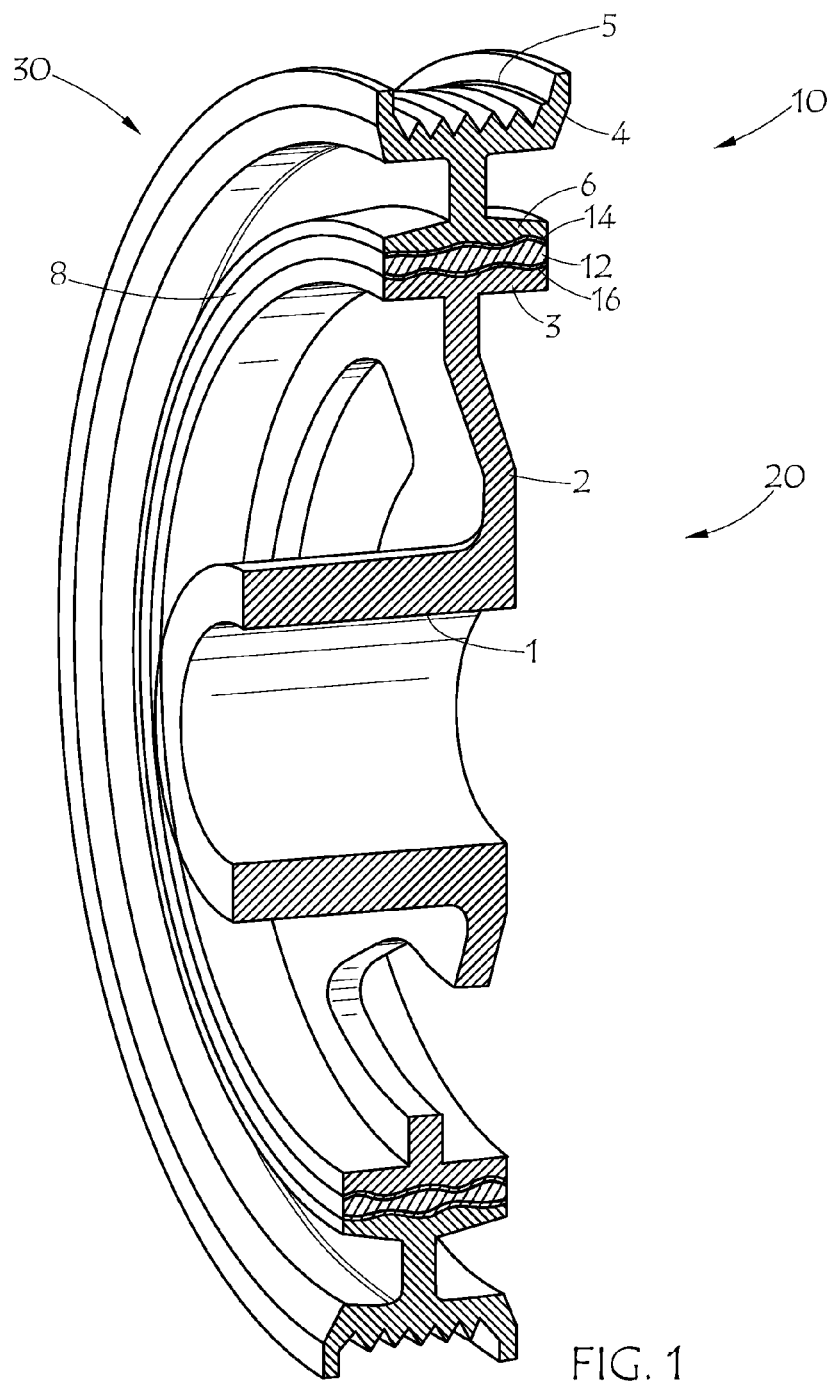
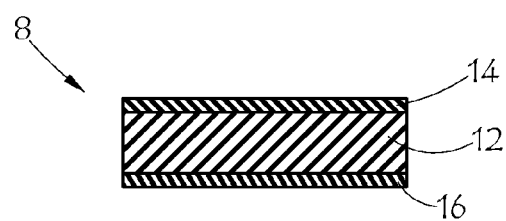

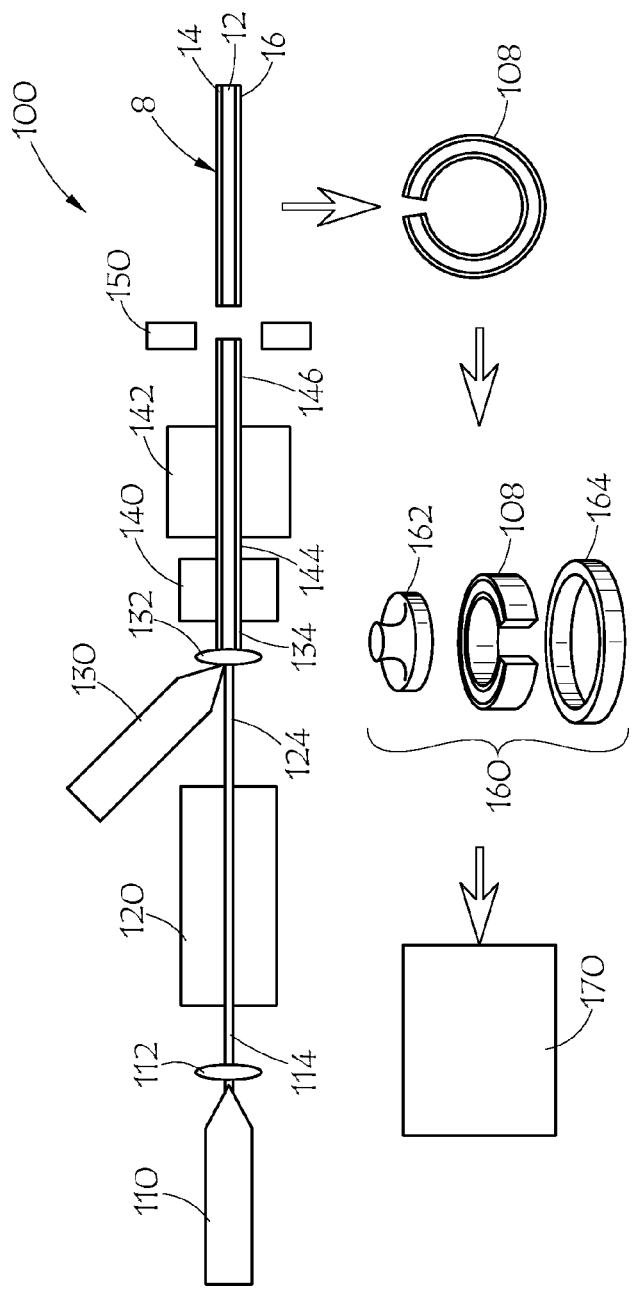
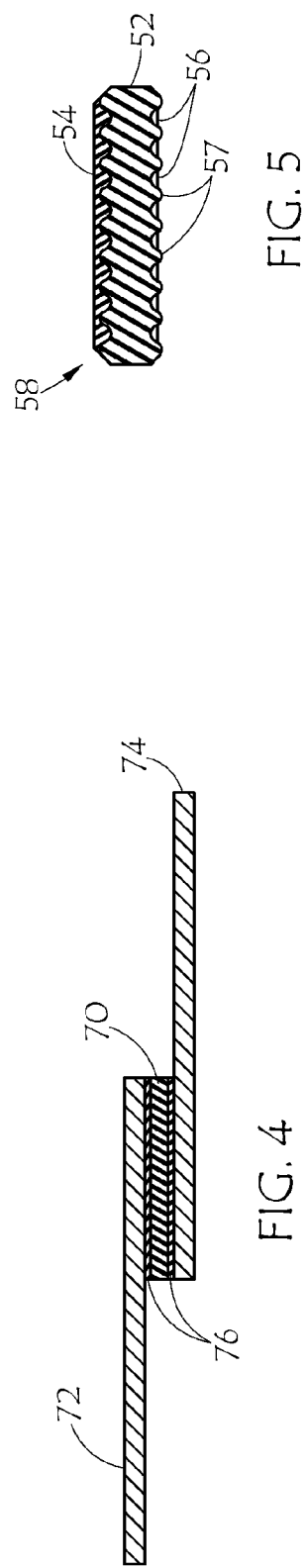

BONDED PART WITH LAMINATED RUBBER MEMBER AND METHOD OF MAKING

BACKGROUND OF THE INVENTION

1. Field of the Invention

This invention relates generally to a method of making a bonded rubber-metal article with a laminated rubber member under compression, more particularly to vibration control devices with a laminated rubber member bonded between two rigid members, and specifically to a torsional vibration damper with annular laminated rubber member directly bonded to the inner and outer rigid or metal members and under compression.

2. Description of the Prior Art

As vehicle engine technology develops, engines are producing high drive torques and more demanding requirements on crankshaft dampers which have a rubber member connecting two rigid, for example metal, members. As a consequence, reliance on friction is not sufficient, and the rubber member must be bonded to the metal surfaces to sustain the high drive torque and improve the durability. Current approaches to bond the rubber to the metal include using a rubber-metal adhesive applied to the rigid or metal members for subsequent vulcanization bonding, or injection molding of a self-bonding rubber composition. These approaches generally permit the rubber to go into a state of tension upon cooling from the vulcanization temperature, resulting in decreased durability and premature part failures at low temperatures. To avoid rubber in tension and maintain the rubber in a state of compression, post-vulcanization bonding may be used with various rubber-metal adhesives applied to the metal bonding surfaces. These bonding technologies generally require a number of expensive process steps to prepare the metal and/or rubber surfaces for bonding, to apply adhesives, to deal with chemicals or emissions, and so forth. A two-step cure method has been disclosed in U.S. Pat. Nos. 7,078,104 and 7,291,241 which disclose self-bonding rubber formulations that eliminate conventional adhesives and a two-step cure method to form the rubber member and bond it to the metal, thus retaining some degree of compression on the rubber. However, in practice, given the competing constraints on formulating and processing the rubber to optimize a tradeoff between bonding and retained compression while tuning rubber modulus, damping, heat resistance, etc., it has yet proven difficult to retain sufficient compression to achieve desired durability targets for crankshaft dampers. The same concerns arise for any kind of bonded rubber composite article or part in which the rubber member is bonded between rigid members and held under compression to enhance durability.

What is needed is a process for bonding rubber to rigid parts with a greater degree of flexibility to achieve higher states of compression over the life of the composite part without sacrificing adhesion or any desired tuning of rubber properties and without using conventional adhesives with their demanding surface preparation requirements.

Mention is made of Applicant's U.S. Pat. No. 8,246,872 and U.S. Pat. No. 7,834,090.

SUMMARY

The present invention is directed to systems and methods which provide a process for bonding rubber to rigid parts with the process flexibility to achieve high states of compression over the life of the composite part without sacrificing adhesion or the ability to tune the rubber properties and without using conventional adhesives.

The invention is directed to a bonded part with a press-fit, vulcanized rubber member residing in compression between two rigid members and bonded thereto, wherein the rubber member is a laminate with a core layer sandwiched between and bonded to two self-bonding rubber layers. The bonded part may be, for example, a vibration damper, isolator or absorber, or any part which holds a bonded rubber layer in compression. The core layer and the self-bonding layers may have the same primary elastomer and cure system type, and the self-bonding layers have an adhesion promoter not present in the core layer. The adhesive layers may be from about 0.05 to about 1 mm thick or from about 5% to about 10% of the laminate thickness. The rigid members may be metal. The amount of said compression may be from about 10% to about 50%.

In an embodiment of the invention the rubber core layer may be a peroxide cured elastomer composition and the self-bonding rubber layers may be a peroxide cured elastomer composition with an adhesion promoter. The primary elastomer type may be an ethylene-alpha-olefin elastomer and the adhesion promoter may be a metal salt of an alpha-beta unsaturated organic acid.

In another embodiment of the invention the core may have at least one surface with hills and valleys, and the adhesive layer may reside in or fill up the valleys.

The invention is also directed to a method which includes forming a rubber core layer, curing the core layer, applying a rubber adhesive layer on each side of the core layer to form a laminate rubber member, inserting the laminate between two rigid members under compression, and post-curing the assembly to form a bonded part. The adhesive layers may be partially cured before inserting. The curing of the core layer may be from 80% to 100% of full cure according to ASTM D-5289 or equivalent test method. The extent of the curing of the core layer may be substantially fully cured.

In an embodiment of the invention the adhesive layer may be applied under pressure and then partially cured to from 30% to 80% of full cure. The applying step may be by extrusion coating. The forming and applying steps may be by co-extrusion. The applying may be by insert molding (either injection, compression or transfer) and may include partially curing the adhesive layers. The applying may be by solution coating with a drying step which may also partially cure the rubber adhesive layer.

In embodiments of the invention the primary elastomers of the core and adhesive layers may be of same type and may be selected from the group consisting of ethylene-alpha-olefin elastomer, EPM, EPDM, SBR, NBR, NR, EVM, EAM, ECO, and blends thereof. The cure systems of the rubber layers may be compatible and co-cure for adhesion there between; and the adhesive layers may have an adhesion promoter not present in the core layer. The core layer may have EPDM as the primary elastomer and a peroxide cure system; and the adhesive layer may have EPDM as primary elastomer, a peroxide cure system, and a metal salt of an unsaturated organic acid as an adhesion promoter. The adhesive layer may include two peroxides with different cure activation temperatures, at least 5° C. apart.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 1 is a partially fragmented perspective view of a torsional vibration damper constructed according to the present invention;

FIG. 2 is a cross section of a rubber laminate according to an embodiment of the invention;

FIG. 3 is a flow chart of a method of making a bonded rubber part according to an embodiment of the invention;

FIG. 4 is a side view of a lap shear adhesion test configuration; and

FIG. 5 is a cross section of a rubber laminate according to another embodiment of the invention.

DETAILED DESCRIPTION

In one embodiment, the invention uses extrusion to apply a thin layer of self-bonding rubber over a substantially fully cured rubber core. The core and self-bonding rubber layers are compatible in terms of curing so that the self-bonding rubber layer will bond to the core layer. The self-bonding rubber layer includes an adhesive promoter which need not be present in the rubber core so that the resulting laminated rubber member will bond to the rigid or metal members of the final composite article. The invention provides a number of advantages over the conventional bonding methods including: no adhesive is required; no special treatment is required on the metal surfaces; the process cost is therefore relatively low; there is excellent bonding without sacrificing the rubber properties; and excellent rubber compression can be maintained.

FIG. 2 shows a cross-sectional view of a typical extruded rubber laminate according to the invention. In FIG. 2, laminated rubber member 8 includes core layer 12, and self-bonding adhesive rubber layers 14 and 16. The core layer makes up the majority of the thickness of the rubber member and therefore provides the required elastomeric properties for the application, such as modulus, damping, flexibility, toughness, strength, compression set resistance, and the like. The adhesive rubber layers are relatively much thinner and are there to provide a strong, durable bond between the core layer and the rigid members. Using a laminate rubber member permits more flexibility in design and formulation of the rubber, since each portion can now be optimized for its specific purposes, instead of having to optimize one formulation to do everything. In an embodiment of the invention, the adhesive layers may each make up about 5% to about 10% of the total laminate thickness. Alternately, the adhesive layers may each range in thickness from about 0.05 mm (0.002 inch) to about 1 mm (0.04 inch), or from about 0.1 mm to about 0.5 mm.

"Compression" means a decrease in thickness in a principal direction under application of a compressive force in that direction. "Compression" does not refer to bulk compression or volumetric compression under hydrostatic pressure herein. For example, press-fitting a rubber laminate into a gap between two rigid plates results in a reduction in thickness of the laminate, i.e. compression, in the direction normal to the surfaces of the plates, and an increase in dimension in the plane parallel to the surface of the plates. Compression is expressed as a percent deformation or deflection based on the original thickness in that direction, as described for example in ASTM D-395. Rubber under some degree of compression is more durable when subjected to dynamic stresses than rubber in a neutral state or under tension. The amount of compression may be from about 1% to about 60%, or from about 5% to about 50%, or preferably from about 10% to about 40%.

"Rigid" means stiff enough to maintain its shape while holding the rubber member in a state of compression. Stiffness is a function of the material properties (such as modulus) and the dimensions of the rigid member. The anticipated use or application of the composite article may also place stiffness requirements on the rigid members. Suitably rigid materials may include: metals, such as steel, brass, aluminum, iron, and their alloys; and high performance thermosets or thermoplastics, such as phenolics, epoxies, polyesters, polyimides, polyamides, polyaryleneetherketones, polyarylenesulfides, polysulfones, polycarbonates, and the like, including those with various reinforcements, fillers, or other additives; and materials based on metal oxides, such as glass or ceramics; and various rigid composites of the foregoing.

"Cure," "vulcanization," and "cross-linking" are generally used interchangeably herein to describe the formation of chemical bonds or crosslinks between polymer chains, regardless of crosslink type, generally as a result of the application of heat, radiation, and/or pressure to a rubber composition, and generally indicated by a decrease in plasticity and increase in elasticity of the rubber composition. State of cure or extent of cure may be determined or characterized for a given rubber composition by use of any of the cure meters or rheometers well-known in the rubber industry, and then inferred for a given part made from that rubber composition from the actual cure conditions and/or processing history applied to that part. For example, percent cure may be determined according to ASTM D-5289, ASTM D-2084, ISO 6502, or the like. "Substantially fully cured" is used herein in the practical sense, meaning the rubber part can be handled, stretched repeatedly, is fully functional, and/or has substantially reached an optimum level of one or more physical properties which depend on cure, such as elongation, tensile and tear strength, compression set, durometer, and the like, any of which may also be used to characterize the extent or state of cure. As a non-limiting example, according to ASTM D-5289, cure to "t90" or more, or to "maximum torque", or to "highest torque" in a specified period of time, or the like may be considered substantially fully cured. In a preferred embodiment the core may be cured from t80 to t90, or 80 to 90% of full cure or a maximum value of a property.

Within the present context, the terms "bonded" and "adhered" unless specifically noted otherwise, are used interchangeably as well recognized in the art, to denote a strong or substantial fixation brought about by chemical reaction. This condition is characterized by any increased force required to separate the relevant substrates compared to that force required to separate the substrates in the absence of such fixation. Bonding strength may exceed rubber tear strength in the practice of the present invention, resulting in cohesive failure of the rubber, but cohesive failure is not necessary to establish that some bonding is achieved within the context of the present invention.

"Self-bonding" or "adhesive" rubber means a rubber composition that will cure and bond to a substrate upon application of heat, radiation, and/or pressure or other suitable cure conditions. The substrate need not have any other type of conventional primer, adhesive, adhesive coating, or adhesive treatment since the self-bonding rubber composition "itself" bonds to the substrate. Generally the applicable substrate is metal or other rigid structural material, but any substrate may be intended depending on the context.

FIG. 1 shows an exemplary article according to an embodiment of the invention in the form of a torsional vibration damper. Referring to FIG. 1, dual ring damper 10 includes inner ring 20 and inertial outer ring 30 and laminated rubber member 8, which is the rubber laminate described above and shown in FIG. 2 in the form of an elastomeric ring. Inner ring 20 includes hub 1 and web 2 and rim 3. Hub 1 is sized to attach to a shaft (not shown, but conventional) such as a crankshaft. The configuration shown in FIG. 1 is for a press fit of hub 1 to a shaft, although a flange, or keyway, or other arrangement known in the art may also be used to secure the hub to a receiving shaft. Inertial outer ring 30 includes rim 6 and belt receiving portion 4. Belt receiving portion 4 may comprise any belt profile known in the art including a flat belt, a V-belt, a toothed belt, or multi-V-ribbed belt profile 5 as shown in FIG. 1. Other composite devices contemplated within the scope of this invention include vibration mounts such as engine mounts, bushings, shaft dampers, isolators, isolation couplings, and the like. The invention is especially suited for devices wherein a rubber member is sandwiched between and bonded to two rigid members in a state of compression, for example to connect or couple the two rigid members with a certain degree of flexibility and/or with some vibration damping, absorption, or isolation.

Rims 3 and 6 describe an annular space in the gap between them. This annular space is fixed in thickness because of the rigid nature of the generally cylindrical rims. Rims 3 and 6 may be flat and/or smooth. Alternatively, rims 3 and 6 may each have a complex shape that allows the rubber member 8 to be mechanically fixed in the annular space such as the wavy shape shown in FIG. 1. Rims 3 and 6 may comprise knobs, surface roughness, or any other form of random surface irregularity or friction producing form to enhance adhesion between rim and elastomer. Generally cylindrical devices with annular gaps are one kind of vibration control device that may have a compressed rubber layer inserted therein which may benefit from the present invention. Other devices may be rectangular with some outer frame and an inner rigid member separated by rubber member(s). The invention is most useful for such devices where the rubber compression is maintained by the rigid members themselves, not by some external force.

The rubber laminate includes a core layer with the self-bonding adhesive layers on each side. The core layer and the adhesive layers may comprise any desired rubber or elastomeric composition, suitably chosen to meet the requirements of the application, such as heat resistance, flexibility, modulus, damping, environmental resistance, and the like. The rubber compositions of the core layer and the adhesive layers include a base elastomer or primary elastomer component, which may be any desired elastomer which preferably can be co-cured or otherwise compatible with the self-bonding rubber layers. It is preferable that both the core rubber layer and the adhesive rubber layers have the same, or similar or at least compatible, primary elastomer, for improving the bonding compatibility between the layers. Suitable primary elastomers include natural rubber (NR), ethylene-alpha-olefin elastomers (such as ethylene propylene copolymers (EPM), ethylene propylene diene terpolymers (EPDM), ethylene octene copolymers (EOM), ethylene butene copolymers (EBM), ethylene octene terpolymers (EODM); and ethylene butene terpolymers (EBDM)); ethylene/acrylic elastomer (AEM), polychloroprene rubber (CR), acrylonitrile butadiene rubber (NBR), hydrogenated NBR (HNBR), styrene-butadiene rubber (SBR), chlorosulfonated polyethylene (CSM, ACSM), epichlorohydrin (ECO), polybutadiene rubber (BR), polyisoprene-based elastomers (IR, IIR, CIIR, BIIR), chlorinated polyethylene (CPE), brominated polymethylstyrene-butene copolymers, styrene-butadiene-styrene (S-B-S) and styrene-ethylene-butadiene-styrene (S-E-B-S) block copolymers, acrylic rubber (ACM), ethylene vinyl acetate elastomer (EVM, EAM), and silicone rubber, or a combination of any two or more of the foregoing or blends thereof. See ASTM D-1418 for other suitable elastomers and abbreviations. In the case of elastomer blends, "primary" elastomer may be used to refer to the blend or to the major elastomer component of the blend. Preferably the core layer has good compression set resistance as measured by ASTM D-395 or equivalent. This helps the rubber member retain the initial compression applied at assembly of the device over the life of the assembly.

The cure system of the core layer rubber composition and/or the self-bonding rubber composition may, for example, be the sulfur-based type with accelerators, sulfur, and the like, or the peroxide-based type with one or more peroxides, coagents and the like, or any other suitable cure system type. Preferably, both core layer and adhesive layers have similar cure systems, or at least compatible systems, to ensure good bonding between the materials upon final cure. Suitable peroxide curatives include, without limitation, 1,1-di-(t-butylperoxy)-3,3,5-trimethylcyclohexane, 2,5-dimethyl-2,5-di-(t-butylperoxy) 3-hexyne, dicumyl peroxide, bis-(t-butylperoxy-diisopropyl benzene), α-α-bis(t-butylperoxy)diisopropyl benzene, di-t-butyl peroxide, 2,5-dimethyl-2,5-di-t-butylperoxyhexane, and t-butylperbenzoate. Peroxides are conventionally incorporated at about 2 to 10 parts weight per hundred parts of rubber ("phr"). Sulfur may optionally be added to the peroxide as part of the cure system at about 0.1 to 1 phr The core layer and the adhesive rubber layer may include any other combination of ingredients known in the art including fillers, fibers, oils, antioxidants, antiozonants, process aids, accelerators, crosslinking aids, coagents, friction modifiers, and the like. The self-bonding rubber layers, at least, also include an adhesion promoter to assure good bonding between the rubber and rigid members of the assembly. The suitable adhesion promoter may be a single ingredient or a combination or system of ingredients. Any known adhesion promoter or adhesion system may be utilized as long as the capability of bonding to both the rigid members and the core rubber layer are achieved. Generally the optimum adhesion system will depend on the choice of primary elastomer, cure system, and rigid material.

Adhesion promoters which can be used include for example, maleated resins, metal salts of alpha-beta unsaturated organic acids, cobalt salts with sulfur, copper and zinc salts, organo-nickel salts, resorcinol-aldehyde resins, phenolic resins, polymaleimides and bismaleimides, isocyanates, silica, silanes, and the like, and various combinations thereof. Maleated or maleinized resins include, for example, maleated polybutadiene or SBR, maleated polyisoprene, maleated vegetable oil, maleated ethylene-alpha-olefin polymer, and the like, for example as described in U.S. Pat. No. 5,300,569, which is hereby incorporated herein by reference. Metal salts of alpha-beta unsaturated organic acids include, for example, metal salts of an alpha,beta-ethylenically unsaturated carboxylic acid as described for example in U.S. Pat. No. 5,776,294, which is hereby incorporated herein by reference. The metal for salts of acrylic and methacrylic acids include, without limitation, zinc, magnesium, sodium, potassium, calcium, barium, cobalt, copper, aluminum and iron. Zinc diacrylate (ZDA) and zinc dimethacrylate (ZDMA) are preferred adhesion promoters for peroxide-cured rubber compositions because of their effectiveness and commercial availability.

Useful polymaleimides and bismaleimides include N,N'-linked bismaleimides containing maleimide groups that are either joined directly at the nitrogen atoms without any intervening structure or in which the nitrogen atoms are joined to and separated by an intervening divalent radical such as alkylene, cycloalkylene, oxydimethylene, phenylene (all 3 isomers), 2,6-dimethylene-4-alkyphenol, or sulfonyl. Preferred maleimide compounds include those formed conventionally by a condensation of maleic anhydride and a diamine compound which has a double bond originating from maleic anhydride at each terminus. A preferred bismaleimide resin employable in the present invention is a reaction product of two moles of maleic anhydride and one mole of an aromatic diamine. Examples of the aromatic diamine employable for this purpose include, but are not limited to, diaminobenzene, 4,4'-diamino-3,3'-dimethylbiphenyl, 1,4-diaminodiphenyl ether, 1,4-diaminodiphenylmethane, 2,2-bis(4-aminophenyl) propane, 1,4-diaminodiphenylsulfone, 1,3-bis(4-aminophenoxy)benzene, 1,4-bis(3-aminophenoxy)benzene, and bis(4-(3-aminophenoxyl)phenyl)sulfone. M-phenylene-bis-maleimide is a presently preferred compound. Polymaleimide compounds include aliphatic or aromatic polymaleimide. Aromatic polymaleimides having from about 1 to 100 aromatic nuclei wherein the maleimide groups are directly attached to each adjacent aromatic ring are preferred.

The invention is also directed to a method of making a rubber-metal bonded part. The rubber member is made by forming a rubber core of predetermined shape and curing it, preferably to a substantially fully cured extent. Then, the self-bonding rubber layer is applied to both sides of the cured core to form a rubber laminate, preferably in a process whereby it is applied under pressure and heat, such as an extrusion or lamination process or in a closed mold. The self-bonding rubber layers may optionally be partially cured if desired for improved handling and/or to initiate bonding to the core rubber. The rubber laminate is then inserted between two rigid members and the final assembly is post cured to complete the cure of the self-bonding layers and effect a bond between them and the rigid members and to the core. The rubber laminate is generally thicker than that gap or space into which it is inserted, resulting in a press fit and in the laminate residing in a state of compression. The insertion process also can generate considerable stress on the laminate, which is why the laminate is preferably formed under pressure and heat and may include partial cure of the adhesive layer, i.e., to improve the integrity and handling of the laminate and prevent delamination during assembly.

FIG. 3 shows one embodiment of the inventive process, using extrusion to form the core and to apply a thin layer of the self-bonding rubber to each side of the core rubber. In FIG. 3, the core rubber goes through first extruder 110 and first die 112 forms raw core 114 into a predefined shape and/or dimension. Then, the raw core goes through a first cure in first curing oven 120, preferably till substantially fully cured. Cured core rubber 124 may be kept at a predetermined temperature as it goes through coating die 132 of second extruder 130 to facilitate bonding with the next layer. The second extruder 130 will apply the thin layer of self-bonding rubber to both sides of the core rubber surface to make raw laminate 134, which may be partly cured in optional second curing oven 140. Finished laminate 144 is cooled in cooling stage 142 before going through cutter 150 to complete the production of laminate rubber member 8, with its core 12 and self-bonding layers 14 and 16. The rubber laminate may be bent to form rubber ring 108, which may be assembled into the annular gap between a damper hub 162 and inertia or pulley ring 164 in assembly operation 160. The assembled damper goes through post-curing in final curing oven 170, i.e., a post-cure step, to activate the bonding of the rubber to the rigid or metal parts.

In another embodiment, the first and second extruders may be combined into a coextrusion step, thus eliminating first cure oven 120. Then the cure of the core layer occurs after lamination, for example in second curing oven 140. For this embodiment, the core layer must have a different cure system from the adhesive layers, which permits substantially full cure of the core before the self-bonding layer cures more than about 70%, preferably no more than about 50% to 70%, when exposed to the same vulcanization conditions in oven 140. Then the resulting finished laminate 144 may continue through the process as described above.

The assembly step includes compressing the laminate into the gap, and may require a lubricant. It has been found that some lubricants may advantageously improve the bonding. Preferably the lubricant is based on a compatible oil or soap which absorbs into the self-bonding layers and/or the rubber core. Thus, the lubricant may be selected from an oil, an aqueous emulsion, a lubricant suspension, a soap solution or the like.

The optional step of partly curing the self-bonding layers in second curing oven 140 may be facilitated by use of two curatives or cure systems with different activation temperatures. Thus, at least two separate curatives or cure systems (i.e., wherein the cure system may include a single curative or blends or mixtures of two or more individual curatives), may be employed to cure the elastomer composition. Such curatives may moreover be advantageously selected such that each such curative or cure system possesses an activation temperature range distinct from the other. In a further embodiment, two such curatives are employed in the elastomer compositions of the present invention, activation of each of which being triggered by exposure to a set of conditions, including temperature, pressure and/or exposure period, different from the other. For substantially equal exposure periods and pressures, activation temperatures of such two curatives according to an embodiment at least five (5) degrees Centigrade apart from one another; more preferably at least fifteen (15) degrees Centigrade apart from one another; and most preferably at least twenty five (25) degrees Centigrade apart from one another may be beneficially employed. Exemplary materials exhibiting respective activation temperatures beneficial in the practice of the present invention include as the first curative, 1,1-Di-(t-butylperoxy)-3,3,5-trimethylcyclohexane such as that available under the trademark VAROX 231XL by R. T. Vanderbilt; and as the second curative, 2,5-dimethyl-2,5-Di-(t-butylperoxy) 3-hexyne such as that available under the trademark VAROX 130XL by R. T. Vanderbilt.

When the optional partial cure of the laminated adhesive layer is used, the degree of cure may be any amount that provides a handling advantage without preventing bonding to the rigid parts during the post-cure step. For example, the degree of cure may be from 20 to 95%, or from 40% to 80%, and preferably the degree of cure is from 50% to 70%.

Other methods of forming the core layer and/or applying the thin layer of adhesive rubber may be used in various embodiments of the invention. For example, one could mold a core rubber ring first, using injection, compression or transfer molding, preferably substantially fully curing it. Then the core rubber ring could be put into a second mold cavity as an insert, wherein the self-bonding elastomer could be applied by injection, or transfer or other molding technique, onto the both inner and outer surface of the core rubber ring, optionally with some degree of partial cure. The self bonding elastomer will act as a bonding agent to bond the rubber onto rigid or metal surfaces during the final curing stage (or "post-curing" after assembly.

As another example of a useful applying step, one could dip the cured rubber core layer into a bonding agent solution to apply a coating layer of adhesive rubber. Multiple dips may be used to achieve the desired layer thickness. The assembly and post-cure (i.e., final cure) steps may be as described above.

In another embodiment of a laminated rubber member 58, illustrated in FIG. 5, core layer 52 could be formed, for example by molding a ring or extruding a profile with a ribbed or toothed shape (i.e., hills and valleys) on one or both sides and then substantially fully curing the core elastomer. The ring or profile may then have applied to it the self-bonding rubber by one of the application methods mentioned above. The self-bonding rubber may then just fill the valleys 56 or fill the valleys and cover the hills 54. The valleys can serve to provide areas with a much greater depth or thickness of adhesive, while the hills provide thinner areas where the fully cured core is closer to, or even exposed 57 to, the rigid members of the final part. This distribution of thicknesses may provide better combination of adhesion and compression stability. The hills and valleys may also help retain adhesive during assembly or other handling. As described above, in another embodiment, the ribbed laminate could be made by coextrusion of two materials with different cure systems, the core being curable faster, at a lower temperature, or the like, relative to the adhesive rubber layers.

Other laminate combinations are also possible. For instance, a core that is layered in its horizontal plane with alternative or alternating elastomer layers may be designed to have a particular set of physical or dynamic properties not possible with a single layer. With a self-bonding outer layer for bonding to the rigid members of the final part, such variations give the dual, heretofore competing benefits of maintaining compression from the bulk of the rubber being a fully cured elastomer and the bonding to rigid surfaces of a self-bonding elastomer.

Examples

To demonstrate embodiments of the invention, a number of example rubber compositions were mixed for use as core and adhesive layers of the rubber laminate. The examples were based on various EPDM elastomers with carbon black or silica filler and peroxide or sulfur curatives. The mixing was done according to conventional practice for rubber materials, i.e., using an internal mixer of the Banbury type. The compounds were generally mixed in two stages, with curatives added in the second stage. Thin adhesive layers of examples H thru N were calendered to a thickness of 0.25 mm, and example O was extruded at 0.5 mm in thickness. Core layers were generally injection molded in the form of annular rings about five inches in diameter, about one inch long, and about 3/16 of an inch thick. The rings were cut into one-inch squares for lap shear adhesion tests and used whole for testing in dampers, as further described below.

A number of core layer rubber compositions (A thru G) for use in embodiments of the invention are described in Table 1. A number of adhesive layer rubber compositions (H thru O) for use in embodiments of the invention are described in Table 2. Core compositions A thru F were used in combinations with adhesive compositions H thru N for lap shear adhesion testing to confirm that the invention had broad applicability to a wide range of laminate combinations and assembly options. The combinations and results are shown in Table 3. Table 3 shows a first series of examples. Inventive examples are designated "Ex.", while comparative examples are designated "Comp. Ex."

A number of comparative examples are included in Table 3, wherein the adhesive composition was used to make a partially cured core and the core then fully cured in contact with metal lap shear tabs with no additional adhesive layer. Lap shear adhesion results provided in the following tables were obtained using steel tabs 72, 74 each measuring 25.4 mm (1 inch) by 63.5 mm (2.5 inches), and molded rubber core slabs 70 measuring 4.8 mm (3/16 of an inch) in thickness by 25.4 mm (1 inch) square laminated with rubber adhesive layers 76 measuring 0.25 mm (10 mil) thick by 1 inch square, assembled according to the method of ASTM D-816, "Type 1 Lap Specimen," such that the rubber laminate sample was substantially fully covered on both relevant surfaces by the metal slab, as illustrated in FIG. 4, under an applied force sufficient to achieve about 25% rubber compression. Thus, the lap shear test evaluated the integrity of the rubber laminate and the entire bonded metal-rubber part.

For many of the examples, various lubricants were applied to the steel and or laminate surfaces to simulate a lubricated assembly operation. "P-80" is an assembly lubricating oil available from International Products Corp., and "R" was a grade of process oil from Clark Oil and Refining Corporation applied in a thin layer to the steel slab surfaces. In most cases, the lap shear specimens were allowed to sit for 1, 4 or 24 hours in contact with the lubricating oil-coated slabs and then cured, as indicated in the footnotes related to assembly details. Finally, the specimens were pulled at a rate of 2 inches per minute to a point of failure. Hot adhesion tests were done at 100° C. The results are reported as peak load in pounds, which also is equivalent to pounds per square inch of bond area. It may be noted that rubber tear is generally a dominant mode of failure for specimens with a peak load of 200 pounds or more, and adhesive failure is generally dominant for peak loads less than 200 pounds, with considerable variation depending on the composition.

For some examples as noted in Tables 3 and 4, the steel parts were grit blasted and/or alkali washed utilizing conventional techniques prior to the application of the assembly lubricant and the insertion of the rubber laminate. The optional step of partially curing the rubber laminate before assembly was not carried out in these examples.

The lap shear results in Table 3 show a number of advantageous results. Comp. Ex. 25-27 may be used as a baseline for the adhesion level attainable pure self-bonding elastomer to metal. Similar levels of adhesion are observed for the inventive combinations. Thus, good results may be obtained for sulfur-cured cores (B and D) or peroxide-cured cores (A, C, and E-F) with a variety of peroxide-cured self-bonding layers. Examples 1-9 and 13-15 illustrate that a variety of core rubber layers (A-E) may be bonded to metal parts with the same adhesive rubber composition (H). This makes the present invention much more flexible than the prior art two-step cure method based on a single rubber formulation. The particular examples cited include both sulfur-cured and peroxide-cured formulations, with various levels of compression set resistance as indicated by the test results in Table 1. The results in Table 3 also illustrate that some combinations of core and adhesive are better than others, and that other variables may be important, such as the details of assembly, lubrication, cure, etc.

Core compositions A, D, and E were laminated with adhesive composition I and the laminate inserted into mock torsional dampers to test the resulting adhesion in a torque to turn test. The combinations and results are shown in Table 4. It can be seen from Table 4 that either a sulfur-cured core (D) or peroxide-cured core (A and E) may be used with the peroxide-cured self-bonding composition I. However, the chemically better-matched combination where both core and adhesive are peroxide-cured gives the strongest TTT result. It may be noted that some of these examples were not tested because they popped apart during post-curing. This was more likely to occur with the machined (smooth) surfaces than with the grit-blasted surfaces.

Core composition G was used with adhesive composition 0 to make exemplary assembled parts in the form of crank dampers to confirm the performance advantages of embodiments of the invention over a conventional approach based on the comparative example rubber composition ("Comp. Ex. 51") shown in Table 1. Comp. Ex. 51 composition was formed and partially cured, assembled into a crank damper, and post cured according to a two-step cure process, as disclosed in U.S. Pat. No. 7,078,104, which is incorporated herein by reference. In these examples, the crank damper was similar to that shown in FIG. 1.

TABLE 2

| Adhesive Layer Compositions | H | I | J | K | L | M | N | O |
|---|---|---|---|---|---|---|---|---|
| Nordel MG 47130 | | | | | | | | 110.5 |
| Nordel IP 4725P | | | | | | | | 15.0 |
| Engage 8180[1] | 100 | | | | | | | |
| Engage 8150[1] | | | | 100 | 100 | 100 | 100 | |
| ROYALTHERM 1411 | | | 100 | | | | | |
| VISTALON 606[2] | | 80 | | | | | | |
| TRILENE CP80 DLC[3] | | 20 | | | | | | |
| ZEOPOL 8745 (Silica) | | | | | | 40 | 40 | |
| HI-SIL 190G (Silica) | 60 | 60 | | | | | | |
| HI-SIL 233 (Silica) | | | | 40 | | | | |
| Carbon Black N330 | | | | | 50 | 50 | | |
| Carbon Black N293 | | | | | | | | 25 |
| Carbon Black N550 | | | | | 5 | | | 45 |
| Paraffin Oil (Sunpar 2280) | | | | | | | | 55 |
| Antioxidant TMQ | | | | 1 | 1 | 1 | | 1.5 |
| Antioxidant ZMTI[4] | 1 | 1 | | | | 1 | 1 | |
| Antioxidant NAUGARD 445[5] | 1 | 1 | | | | | | |
| Antioxidant ETHANOX 702[6] | 0.5 | 0.5 | | | | 0.5 | 0.5 | |
| Zinc Oxide | 5 | 5 | | 5 | 5 | 5 | 5 | 5 |
| Zinc Stearate | | 1.5 | | | | | | 1.5 |
| Zinc Dimethacrylate | 15 | 15 | | 5 | 30 | 30 | | 33 |
| Zinc Diacrylate[7] | | | | | 30 | | 30 | |
| N-N'-m-phenylenebismaleimide | | | | | | | | 0.8 |
| Ricon 154[8] | | | | | | | | 0.2 |
| VUL-CUP 40KE | | | 6 | 8 | 8 | 8 | 8 | |

TABLE 1

| Core Layer Compositions | A | B | C | D | E | F | G | COMP. EX. 51 |
|---|---|---|---|---|---|---|---|---|
| Keltan K7441A[1] | | 175 | 175 | 175 | 175 | 175 | | 175 |
| Nordel MG 47130[2] | | | | | | | 110.5 | |
| Nordel IP 4725P[2] | | | | | | | 15.0 | |
| Royaltherm 1411[3] | 100 | | | | | | | |
| HiSil 233 (Silica) | 6 | | | | | | | |
| HiSil 243LD (Silica) | | | | | | | 8 | |
| Carbon Black N293 | | | | | | | | 36 |
| Carbon Black N550 | 3 | | | 62 | 62 | | 65 | 79 |
| Carbon Black N358 | | 47 | 47 | | | | | |
| Carbon Black N472 | | | | | | 89 | | |
| Triethanolamine | | 0.6 | 0.6 | 0.6 | 0.6 | 0.6 | 1 | 1 |
| Paraffin Oil (Sunpar 2280) | | 10 | 5 | 10 | 5 | 30 | 50 | 6 |
| Antioxidant TMQ[4] | 1 | | | | | 1.5 | 1.5 | 1.5 |
| Zinc Oxide | | 5 | 5 | 5 | 5 | 5 | 5 | 5 |
| Stearic Acid | | 1.5 | | 1.5 | | 1.5 | 1.5 | |
| Zinc Stearate | | | 1.5 | | 1.5 | | | |
| Zinc Dimethacrylate[5] | 3 | | | | | | | 33 |
| N-N'-m-phenylenebismaleimide[6] | | | | | | 0.8 | 1 | 1 |
| Vestenamer 8012 (process aid from Evonik) | | | | | | | 2 | |
| VUL-CUP 40KE | 3 | | 9 | | 9 | 10 | 5 | |
| VAROX 130XL | | | | | | | | 1 |
| VAROX 231XL | | | | | | | | 5.4 |
| N-Cyclohexyl-2-benzothiazole sulfenamide | | 0.8 | | 0.8 | | | | |
| Tetramethylthiuram disulfide (75%) | | 2.45 | | 2.45 | | | | |
| Sulfur | | 0.64 | 0.24 | 0.64 | 0.24 | | | |
| Comp. Set 22 h/100° C. (%) | | 18.6 | 7 | 16.9 | 8.2 | | | |
| Comp. Set 22 h/150° C. (%) | 71.9 | 49.2 | 20.6 | 48.7 | 20.3 | 14.5 | 28.2 | 31-40 |
| Comp. Set 22 h/150° C.-post cured (%) | | | | | | | 12.8 | |

[1]EPDM from DSM Elastomers.
[2]EPDM from Dow Chemical.
[3]Silicone-modified EPDM from Lion Copolymer.
[4]polymerized 1,2-dihydro-2,2,4-trimethylquinoline.
[5]SR-634 from Sartomer.
[6]HVA-2 from DuPont.

TABLE 2-continued

| Adhesive Layer Compositions | H | I | J | K | L | M | N | O |
|---|---|---|---|---|---|---|---|---|
| VAROX 130XL | | | | | | | 2 | |
| VAROX 231XL | | | | | | | | 4.4 |

[1]EOM from Dow Chemical.
[2]EPM from ExxonMobile Chemical.
[3]Liquid EPM from Lion Copolymer.
[4]Zinc 2-mercaptotolylimidazole.
[5]Substituted diphenylamine.
[6]4,4'-methylenebis-(2,6,di-t-butyl phenol).
[7]SR-633 from Sartomer Company.
[8]Liquid Polybutadiene resin from Sartomer Company.

To make a crank damper, the elastomeric composition for the core layer, "G" in Table 1, was molded into a strip about 4-mm thick by about 25-mm wide by compression molding for about 80 seconds at about 175° C., enough to substantially fully cure the composition. The self-bonding adhesive composition, "O" in Table 2, was extruded as a film 0.5 mm thick and applied to both sides of the core strip. The resulting laminate was heated for 50 seconds at 160° C. to partially cure the adhesive layers and then was force fit into the damper gap with the aid of an alkali soap lubricant. The metal bonding surfaces were wiped with a rag to remove excess residue from the machining operations, but no further cleaning or surface preparations were carried out. The gap of the dampers used was about 3.5 mm in spacing, and the laminated elastomeric member was thus about 5 mm thick, including two adhesive layers each about 0.5 mm thick. Thus, the elastomer was compressed about 30% upon insertion into the gap, and the adhesive layers were each about 10% of the total thickness. The damper assembly was placed in an oven for 60 minutes at 190° C., activating the self-bonding layer, causing it to bond to the core and to the metal damper parts (hub and ring).

The torque-to-turn test ("TTT") was carried out on the damper examples at room temperature by rotating the hub with the outer ring fixed at a rate of 1 degree/second until the laminate rubber element and/or the bond failed and recording the peak torque. For some examples, the TTT test was done after a durability test involving a predetermined period of time (generally 40 hours was the target time) on a vibrating rotational shaker test at resonant frequency in a 100° C. environment with a hub excitation amplitude of 0.2 or 0.3 degrees double amplitude ("DDA"). When reported, tensile tests followed ASTM D-412 using dumbbells cut from molded plates. Compression set tests followed ASTM D-395 Method B with 25% compression. Other aspects of the examples will be explained below.

Comparative damper assemblies were made according to the two-step cure method of U.S. Pat. Nos. 7,078,104 and 7,291,241, the entire contents of which are hereby incorporated herein by reference. The rubber used was composition "Comp. Ex." in Table 1.

The results of the damper testing show the advantage of the current inventive method. The Ex. 50 damper with the laminated rubber exhibited sufficient original adhesion, as indicated by a TTT result of 1732 N-m with rubber tear as the failure mode. After a 40-hour durability test at 0.2 DDA, the TTT result was 1454 N-m (a retained torque to turn of about 84%). By comparison, the Comp. Ex. 51 dampers had original TTT values of 3448 N-m, but only retained about 22% of that torque strength after 40 hours at 0.2 DDA. After a more severe test of 40-hours at 0.3 DDA, Ex. 50 dampers still retained 73% of their original torque, while Comp. Ex. 51 only survived for 10 hours with adhesive failure at the hub surface.

TABLE 3

| Ex. No. | Core | Adhesive | Lube | Assembly Details | RT Adh. (psi) | Hot Adh. (psi) |
|---|---|---|---|---|---|---|
| Ex. 1 | B | H | None | 1 | 136 | 2 |
| Ex. 2 | C | H | None | 1 | 246 | 23 |
| Ex. 3 | A | H | None | 1 | 229 | 9 |
| Ex. 4 | B | H | P-80 | 1 | 203 | 1 |
| Ex. 5 | C | H | P-80 | 1 | 234 | 12 |
| Ex. 6 | A | H | P-80 | 1 | 218 | 6 |
| Ex. 7 | B | H | R | 1 | 193 | 6 |
| Ex. 8 | C | H | R | 1 | 431 | 89 |
| Ex. 9 | A | H | R | 1 | 259 | 27 |
| Ex. 10 | D | I | None | 1 | 22 | 4 |
| Ex. 11 | E | I | None | 1 | 80 | 31 |
| Ex. 12 | A | I | None | 1 | 23 | 28 |
| Ex. 13 | D | H | None | 1 | 386 | 19 |
| Ex. 14 | E | H | None | 1 | 536 | 114 |
| Ex. 15 | A | H | None | 1 | 233 | 13 |
| Ex. 16 | D | J | None | 1 | 262 | 40 |
| Ex. 17 | E | J | None | 1 | 262 | 98 |
| Ex. 18 | A | J | None | 1 | 116 | 30 |
| Ex. 19 | D | J | P-80 | 1 | 47 | 5 |
| Ex. 20 | E | J | P-80 | 1 | 88 | 23 |
| Ex. 21 | A | J | P-80 | 1 | 120 | 30 |
| Ex. 22 | D | J | R | 1 | 202 | 36 |
| Ex. 23 | E | J | R | 1 | 237 | 91 |
| Ex. 24 | A | J | R | 1 | 169 | 43 |
| Comp. Ex. 25 | I | — | None | 1 | 165 | — |
| Comp. Ex. 26 | H | — | None | 1 | 238 | — |
| Comp. Ex. 27 | J | — | None | 1 | 166 | — |
| Ex. 28 | F | K | P-80 | 2 | 201 | — |
| Ex. 29 | F | L | P-80 | 2 | 162 | — |
| Ex. 30 | F | M | P-80 | 2 | 233 | — |
| Ex. 31 | F | N | P-80 | 2 | 384 | — |
| Comp. Ex. 32 | H | — | P-80 | 2 | 353 | — |
| Ex. 33 | F | K | R | 2 | 374 | — |
| Ex. 34 | F | L | R | 2 | 619 | — |
| Ex. 35 | F | M | R | 2 | 295 | — |
| Ex. 36 | F | N | R | 2 | 570 | — |
| Comp. Ex. 37 | H | — | R | 2 | 447 | — |

[1]Assembly details: clean, grit-blasted steel, 20 min./175° C. post-cure.
[2]Assembly details: clean, grit-blasted steel, 1-hr. wait, 45 min./171° C. post-cure.

TABLE 4

| Ex. No. | Core | Adhesive | Lube | Assembly Details | TTT (ft-lbs) |
|---|---|---|---|---|---|
| Ex. 38 | D | I | P-80 | 3M | — |
| Ex. 39 | D | I | P-80 | 3G | 239 |
| Ex. 40 | E | I | P-80 | 3M | 583 |
| Ex. 41 | E | I | P-80 | 3G | 273 |
| Ex. 42 | A | I | P-80 | 3M | 432 |
| Ex. 43 | A | I | P-80 | 3G | 344 |
| Ex. 44 | D | I | R | 4M | — |
| Ex. 45 | D | I | R | 4G | — |
| Ex. 46 | E | I | R | 4M | 881 |
| Ex. 47 | E | I | R | 4G | 459 |
| Ex. 48 | A | I | R | 4M | 615 |
| Ex. 49 | A | I | R | 4G | 496 |

[3] M = machined bonding surfaces, G = grit-blasted bonding surfaces; 24-hr. wait, then post cured 20 min./175° C.;
[4] M and G have same meaning; 4-hr. wait, then post cured 30 min./177° C.

TABLE 5

| Damper Durability testing | Ex. 50 | Comp. Ex. 51 |
|---|---|---|
| TTT original (N-m) | 1732 | 3448 |
| TTT after 40 hrs@0.2 DDA (N-m) | 1454 | 766 |
| (% of original) | 84% | 22% |
| TTT after 40 hrs@0.3 DDA (N-m) | 1260 | 1243[1] |
| (% of original) | 73% | 36% |

[1]This test only ran 10 hours due to adhesion failure.

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A method comprising:
    (a) forming a rubber core layer from an elastomer composition comprising a primary elastomer and a cure system;
    (b) curing said core layer at least 80% of full cure according to ASTM D-5289 or equivalent test method;
    (c) applying a self-bonding rubber adhesive layer on each side of said cured core layer to form a rubber laminate;
    (d) inserting said rubber laminate between two rigid members where it resides under compression to form a composite article; and
    (e) post-curing said composite article to cure the self-bonding rubber layer and to effect a bond between the self-bonding rubber layers and the rigid members and to effect a bond between the self-bonding rubber layers and the core layer, thus forming a bonded part;
    wherein each self-bonding rubber adhesive layer is cured to no more than 70% of full cure according to ASTM D-5289 or equivalent method before said inserting.

2. The method of claim 1 wherein the extent of said curing of said core layer in step (b) is 100% of full cure according to ASTM D-5289 or equivalent test method.

3. The method of claim 1 wherein the extent of said curing of said core layer in step (b) is substantially fully cured.

4. The method of claim 1 wherein each adhesive layer is 0.05 mm to 1.0 mm in thickness.

5. The method of claim 1 wherein each adhesive layer is from about 5% to about 10% of the total laminate thickness.

6. The method of claim 1 wherein each adhesive layer is applied under pressure and then partially cured to from 30% to 80% of full cure before said inserting step.

7. The method of claim 1 wherein said applying is by extrusion coating with a self-bonding rubber composition.

8. The method of claim 1 wherein said forming and said applying is by co-extrusion.

9. The method of claim 1 wherein said applying is by an insert molding process selected from the group consisting of injection molding, compression molding, and transfer molding and includes partially curing the adhesive layers to no more than 70% of full cure.

10. The method of claim 1 wherein said applying is by solution coating with a drying step which also partially cures each adhesive layer to no more than 70% of full cure.

11. The method of claim 1 wherein the primary elastomers of the core layer and each adhesive layer are the same type and selected from the group consisting of ethylene-alpha-olefin elastomer, ethylene propylene copolymers (EPM), ethylene propylene diene terpolymers (EPDM), styrene-butadiene rubber (SBR), acrylonitrile butadiene rubber (NBR), natural rubber (NR), ethylene vinyl acetate elastomer (EVM, EAM), epichlorohydrin (ECO), and blends thereof; and wherein cure systems of the core layer and each adhesive layer are compatible and co-cure for adhesion there between; and wherein each adhesive layer comprises an adhesion promoter not present in the core layer.

12. The method of claim 11 wherein the core layer comprises EPDM as the primary elastomer and a peroxide cure system;
    and each adhesive layer comprises EPDM as primary elastomer, a peroxide cure system, and a metal salt of an unsaturated organic acid as the adhesion promoter.

13. The method of claim 12 wherein the rigid members are metal members.

14. The method of claim 13 wherein each adhesive layer includes two peroxides with different cure activation temperatures at least 5° C. apart.

* * * * *